US012608501B2

(12) United States Patent
Franke et al.

(10) Patent No.: US 12,608,501 B2
(45) Date of Patent: Apr. 21, 2026

(54) PRIVACY-PRESERVING LOG ANALYSIS

(71) Applicant: Hitachi Energy Ltd, Zürich (CH)

(72) Inventors: Carsten Franke, Stetten (CH); Theo Widmer, Birmenstorf (CH); Thomas Locher, Zürich (CH); Yvonne-Anne Pignolet, Zürich (CH)

(73) Assignee: Hitachi Energy Ltd., Zürich (CH)

( * ) Notice: Subject to any disclaimer, the term of this patent is extended or adjusted under 35 U.S.C. 154(b) by 148 days.

(21) Appl. No.: 16/760,856

(22) PCT Filed: Oct. 30, 2018

(86) PCT No.: PCT/EP2018/079667
§ 371 (c)(1),
(2) Date: Apr. 30, 2020

(87) PCT Pub. No.: WO2019/086429
PCT Pub. Date: May 9, 2019

(65) Prior Publication Data
US 2021/0097195 A1 Apr. 1, 2021

(30) Foreign Application Priority Data

Oct. 30, 2017 (EP) .................................... 17199282

(51) Int. Cl.
*G06F 21/62* (2013.01)
*G06F 21/60* (2013.01)
(52) U.S. Cl.
CPC ........ *G06F 21/6227* (2013.01); *G06F 21/602* (2013.01); *G06F 2221/2101* (2013.01)
(58) Field of Classification Search
None
See application file for complete search history.

(56) References Cited

U.S. PATENT DOCUMENTS 8,429,421 B2 * 4/2013 Chase .................. G06F 16/907
713/189
8,930,691 B2 * 1/2015 Kamara .................... H04L 9/00
713/165
(Continued)

FOREIGN PATENT DOCUMENTS

CN 107070848 A 8/2017
EP 2677441 A1 * 12/2013 ....... G06F 16/24526
(Continued)

OTHER PUBLICATIONS

Kim, NamHo, and SeongHo Lee. "Design of city logging system using searchable image encryption system of streaming service." International Journal of Smart Home 8.2 (2014): 7-14.*
(Continued)

*Primary Examiner* — Syed A Zaidi
*Assistant Examiner* — Vadim Savenkov
(74) *Attorney, Agent, or Firm* — Slater Matsil, LLP

(57) ABSTRACT

A method can be used to analyze a log of a device or a plurality of devices of a first entity. The method includes generating an encrypted log by encrypting the log at the first entity, generating an encrypted query by encrypting a query at the first entity, transferring the encrypted log and the encrypted query from the first entity to a second entity, analyzing the encrypted log on the second entity by using the encrypted query, generating an encrypted analysis result at the second entity, transferring the encrypted analysis result from the second entity to the first entity, decrypting the encrypted analysis result on the first entity, and verifying the decrypted analysis result at the first entity.

21 Claims, 2 Drawing Sheets

(56) References Cited

U.S. PATENT DOCUMENTS

| | | | | |
|---|---|---|---|---|
| 9,087,212 | B2* | 7/2015 | Balakrishnan | G06F 21/6227 |
| 9,118,631 | B1 | 8/2015 | Yung et al. | |
| 9,281,941 | B2* | 3/2016 | Gentry | H04L 9/0618 |
| 9,436,835 | B1* | 9/2016 | Saldamli | G06F 21/602 |
| 9,646,166 | B2* | 5/2017 | Cash | G06F 21/6218 |
| 9,697,355 | B1* | 7/2017 | Park | G06F 21/554 |
| 9,852,306 | B2* | 12/2017 | Cash | H04L 9/0894 |
| 9,946,810 | B1* | 4/2018 | Trepetin | H04L 9/008 |
| 10,268,834 | B2* | 4/2019 | Pourzandi | H04L 9/008 |
| 10,833,841 | B2* | 11/2020 | Kerschbaum | H04L 9/002 |
| 2005/0071337 | A1 | 3/2005 | Baranczyk et al. | |
| 2009/0019092 | A1 | 1/2009 | Dettinger et al. | |
| 2010/0198846 | A1 | 8/2010 | Gupta | |
| 2012/0134491 | A1* | 5/2012 | Liu | H04L 9/0869 380/28 |
| 2012/0159180 | A1 | 6/2012 | Chase et al. | |
| 2013/0191650 | A1* | 7/2013 | Balakrishnan | G06F 21/6227 713/190 |
| 2015/0172044 | A1* | 6/2015 | Teranishi | G06F 21/60 380/28 |
| 2015/0295716 | A1* | 10/2015 | Liu | H04L 9/008 713/191 |
| 2015/0381637 | A1 | 12/2015 | Raff et al. | |
| 2016/0283728 | A1 | 9/2016 | Antonopoulos et al. | |
| 2016/0294553 | A1* | 10/2016 | Hattori | H04L 9/14 |
| 2016/0344707 | A1 | 11/2016 | Philipp | |
| 2017/0099262 | A1* | 4/2017 | Kerschbaum | H04L 67/1097 |
| 2017/0103227 | A1* | 4/2017 | Kerschbaum | H04L 9/008 |
| 2017/0124348 | A1 | 5/2017 | Pourzandi et al. | |
| 2017/0279605 | A1* | 9/2017 | Lee | G06F 21/6227 |
| 2017/0344646 | A1* | 11/2017 | Antonopoulos | H04L 63/205 |
| 2018/0019866 | A1* | 1/2018 | Kerschbaum | H04L 9/0618 |
| 2018/0109376 | A1* | 4/2018 | Gentry | H04L 9/0838 |
| 2018/0300497 | A1* | 10/2018 | Carpov | H04L 9/008 |
| 2018/0375838 | A1* | 12/2018 | Hersans | H04L 9/0618 |
| 2019/0089526 | A1* | 3/2019 | Locher | H04L 9/30 |
| 2019/0340389 | A1* | 11/2019 | Hattori | G06F 21/6254 |
| 2021/0081562 | A1* | 3/2021 | Hirano | H04L 9/06 |

FOREIGN PATENT DOCUMENTS

| | | | | |
|---|---|---|---|---|
| EP | | 3002904 | A1 * 4/2016 | H04L 9/008 |
| WO | WO-2013188929 | A1 * 12/2013 | | H04L 9/008 |
| WO | | 2014001037 | A2 1/2014 | |
| WO | WO-2014109828 | A2 * 7/2014 | | G06F 17/3069 |

OTHER PUBLICATIONS

K. Li, W. Zhang, C. Yang and N. Yu, "Security Analysis on One-to-Many Order Preserving Encryption-Based Cloud Data Search," in IEEE Transactions on Information Forensics and Security, vol. 10, No. 9, pp. 1918-1926, Sep. 2015, doi: 10.1109/TIFS.2015. 2435697.*

Fuller, B., O'Neill, A., Reyzin, L. (2012). A Unified Approach to Deterministic Encryption: New Constructions and a Connection to Computational Entropy. In: Cramer, R. (eds) Theory of Cryptography. TCC 2012. Lecture Notes in Computer Science, vol. 7194. Springer, Berlin, Heidelberg.*

B. Wang and X. Fan, "Search Ranges Efficiently and Compatibly as Keywords over Encrypted Data," in IEEE Transactions on Dependable and Secure Computing, vol. 15, No. 6, pp. 1027-1040, Nov. 1-Dec. 2018, doi: 10.1109/TDSC.2016.2634013.*

Kerschbaum, F., & Tueno, A . . . (2017). An Efficiently Searchable Encrypted Data Structure for Range Queries. arXiv:1709.09314 [cs.CR].*

Li, K. et al.; "Security Analysis on One-to-Many Order Preserving Encryption Based Cloud data Search," IEEE Transactions on Information Forensics and Security, Sep. 2015, 9 pages.

* cited by examiner

Figure 1

PRIVACY-PRESERVING LOG ANALYSIS

CROSS-REFERENCE TO RELATED APPLICATIONS

This patent application is a national stage filing of International Application No. PCT/EP2018/079667, filed on Oct. 30, 2018, which application claims priority to European Patent Application No. 17199282.9, filed Oct. 30, 2017, which are hereby incorporated by reference in their entirety.

TECHNICAL FIELD

The disclosure relates to methods, devices and systems for a privacy preserving log analysis.

BACKGROUND

Security logs of utilities often contain business-critical information such as user names, system names, system IP addresses, and system configuration parameters. Therefore, utilities are very reluctant to share such logs with any other party including system vendors.

Security logs however may contain very important information as well. For example, (attempted) misuse of the system is often logged, providing information as to who performed what type of action at what time. The utility needs some mechanisms to automatically identify cases when internal or external users try to get access without permission.

So far, the utility either needed to perform these security checks by itself or to trust a third party (e.g., a vendor) to perform the analysis. In the latter case, the confidential information was encrypted and then sent to the third party, which has the right key for decrypting the data and to perform the analysis. Both described general cases are often not in line with the business model and security demand of the utility.

SUMMARY

Embodiments of the invention relate to methods, devices and systems for a privacy preserving log analysis. Particular embodiments relate to a method for analyzing a log of a device or a plurality of devices of a first entity by providing analysis methods on a second entity without violation of privacy demands.

Embodiments of the invention can provide methods, devices and systems for analyzing sensitive security logs without any violation of privacy demands.

According to a further preferred embodiment, the present invention relates to a non-transitory computer readable medium including the computer program code for performing the steps of the method of the invention, e.g., as discussed above or claimed in the claims and as schematically shown in FIG. 2.

BRIEF DESCRIPTION OF THE DRAWINGS

The subject-matter of the invention will be explained in more detail with reference to preferred exemplary embodiments which are illustrated in the attached drawing, in which:

Figure 1:
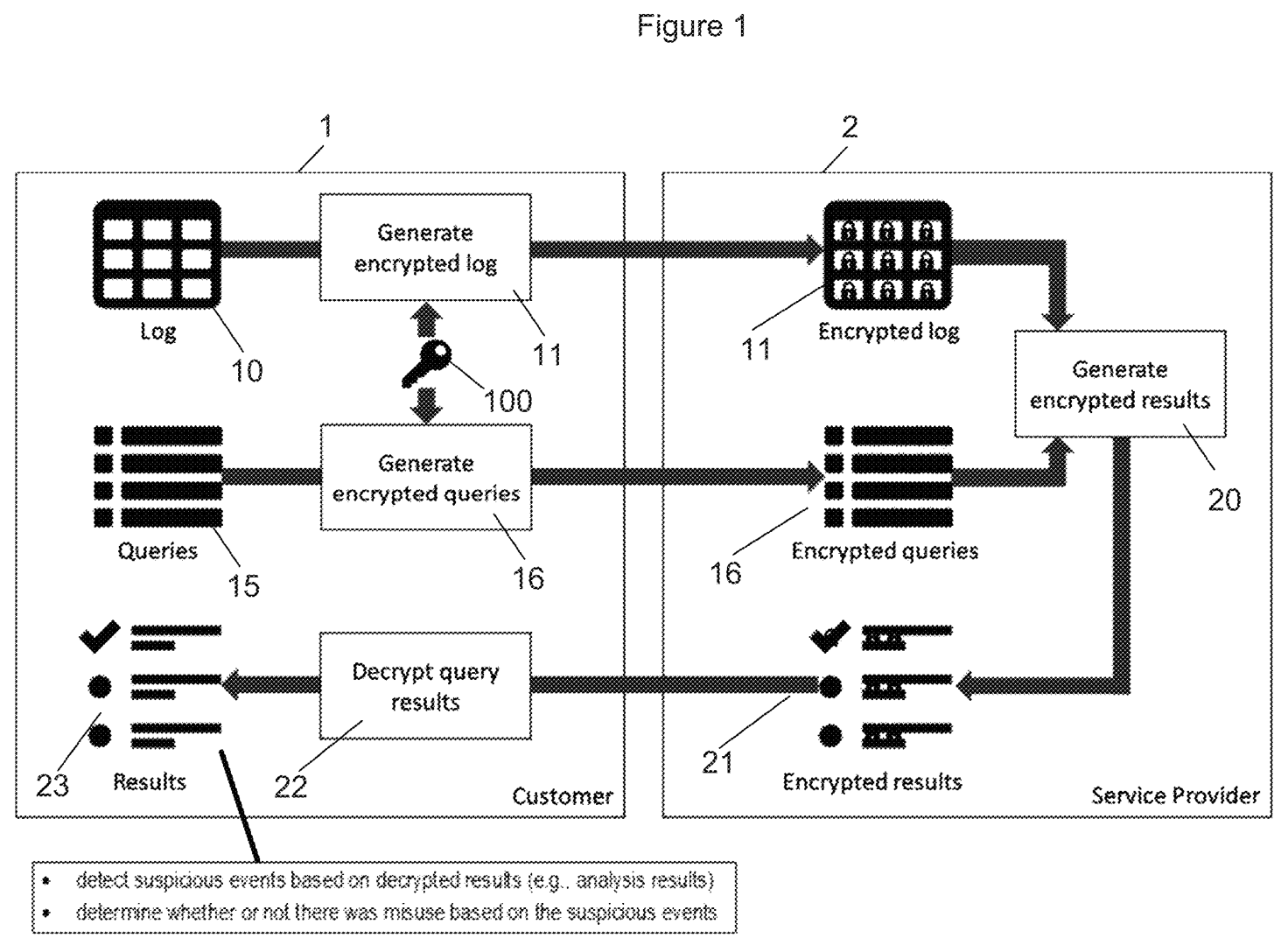

FIG. 1 schematically shows the first and second entity with the encryption, decryption and transferring steps;

DETAILED DESCRIPTION OF ILLUSTRATIVE EMBODIMENTS

Figure 2:
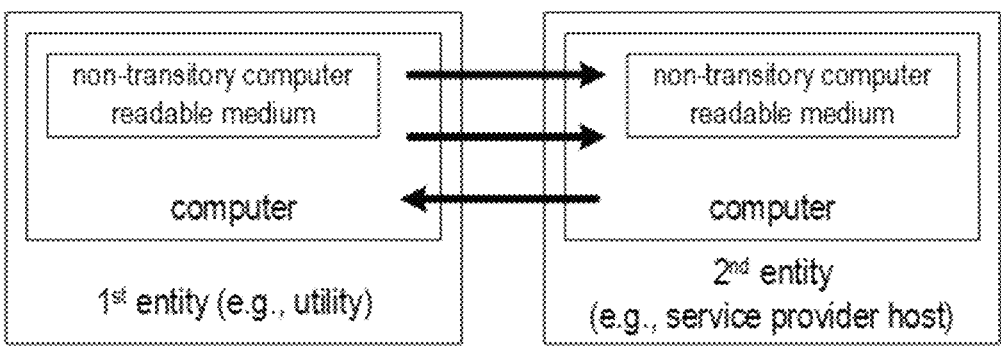
FIG. 2 schematically shows a first and second entity, each with computers including respective non-transitory computer readable media.

For example, embodiments of the present invention can solve the problem of analyzing sensitive security logs of a first entity (e.g., utility) by a second entity (e.g., a third party such as a vendor) without any violation of the privacy demand of the first entity. When the first entity is a utility, the utility data are, at all times, only visible to the utility and only the utility can review the results of the analysis. A third party (second entity) receives encrypted logs, preferably without any decryption keys, and can therefore only see structured but "meaningless" data. These encrypted security logs can be used as input to special analysis algorithms that generate output that only the utility can understand using the original security logs. Since the generated results are still encrypted, the third party does not gain any insights into the utility or their operation.

This way, data analysis of security logs can be outsourced by the utility without losing control over its logs and the interpretation of the corresponding analysis results.

According to a first embodiment, the present invention provides a method for analyzing a log of a device or a plurality of devices of a first entity. The method comprises generating an encrypted log by encrypting the log, preferably on at least one device of the first entity and preferably generating at least an encrypted query by encrypting the query on at least one device for analyzing the log. The encryption of the log and the encryption of the query could be performed on the same device or on different devices. However, it is preferred to use the same keys for the encryption of the log and the encryption of the query. Subsequently, the encrypted log and the encrypted query are transferred from the first entity to a second entity. Preferably, the first and second entities are different entities, e.g., different hardware preferably located at different location. It is further preferred that the first and second entity are administrated by different administrators.

The encrypted log is analyzed on the second entity by using the encrypted query, wherein the result of the analysis is an encrypted analysis result. The encrypted analysis result can be transferred back from the second entity to the first entity, where the encrypted analysis result can be decrypted on the first entity. Subsequently, it is possible to verify and to use the decrypted analysis result on the first entity for further analysis and/or queries.

According to a preferred embodiment, the first entity is a utility or a cluster of utilities of a customer and the second entity is preferably a host which belongs to a company which offers such an analysis service, e.g., a service provider. For instance, the second entity could be a host provided directly by a service provider or a provider that is renting hosts from other providers (statically or dynamically).

The encrypted log and/or the encrypted query are preferably encrypted by a first (private/secret) key which is preferably not known by the second entity. The key for encrypting the log and query is preferably the same key. However, the keys might be different.

According to a preferred embodiment, the encryption of the log and the encryption of the query are preferably based on a deterministic encryption scheme, preferably a k-deterministic encryption scheme.

According to a further preferred embodiment, the log can be a security log of a device or utility, a log of industrial equipment like a controller, station computer, networking devices, scada system, power distribution equipment, a security log of a network and/or a log of an industrial controller, a log of a compute element or a collection of compute elements, a log of an entire system comprising multiple devices.

According to a preferred embodiment, the steps of generating the encrypted log, analyzing the encrypted log and/or transferring the encrypted analysis result are preferably executed systematically, periodically and/or manually.

According to further increase security, the step of transferring between the first entity and second entity is preferably performed via a secure channel.

The log of the present invention is not limited to a specific type. For instance, the log can be organized in columns and rows. Preferably, the encrypted log is generated by encrypting only parts of the columns and/or rows separately. The log may also comprise additional dummy rows, dummy columns, dummy entries, permutated rows and/or columns and/or additional flags for providing additional information.

According to a preferred embodiment, the query is preferably a filter query for locating and/or identifying a specific value in the log and/or an occurrence query for evaluating whether a specific value is present in the log.

The present invention is not limited to the above discussed methods and could be realized by software and/or hardware. In particular, the present invention relates to a system for analyzing a log of a device or a plurality of devices of a first entity. The system preferably comprises: the first entity configured to generate an encrypted log and preferably at least an encrypted query by encrypting the log and/or the query on at least one device of the first entity. The system preferably further comprises a second entity configured to receive and to analyze the encrypted log by using the encrypted query and configured to generate an encrypted analysis result. The first entity is preferably configured to receive the encrypted analysis result from the second entity and preferably further configured to decrypt the encrypted analysis result on at least one device of the first entity and to verify the decrypted analysis result.

Exemplary embodiments of the invention will now be described with reference to the drawing.

So far, the utility always needed to perform the analysis in-house or trust a third party by sharing keys for encrypted data. The method of the present invention overcomes disadvantages of the prior art in that an analysis is executed on encrypted data by a third party (second entity), wherein only the utility (first entity) can interpret the results in a meaningful way.

In particular, the method of the present invention provides an advantage in cases privacy is a key requirement by customers. For utilities, security logs and the information contained therein (e.g., IP addresses, configuration parameters, user names) are considered critical information that utilities do not want to share with third parties. The method of the present invention provides new services because customers can verify the involved cryptographic algorithms and therefore be sure that the third party cannot trace individual values, but is still able to analyze the data for the customer.

The following parties are involved in the exemplary scenario of the present invention as illustrated in FIG. 1.

A customer 1 with devices producing security logs 10 and the service provider 2 (third party). A security log 10 may comprise a list of entries with fields for the time of day, date, and arbitrary information about the event that corresponds to this log entry.

The customer encrypts its security log 10 with its own private key, not known to anyone else (more details below). In other words, an encrypted log 11 is generated. The customer sends the encrypted data items to the service provider 2.

Indices of fields to be compared and the encrypted values involved for different analyses are composed and sent to the service provider (more details below). In other words, encrypted queries 16 are generated.

The service provider 2 runs the analysis on the encrypted data, entry by entry. Entries that match the predicate of a query are sent back to the customer.

The customer decrypts 22 the entries received and verifies (i.e., detects) if suspicious behavior occurred. For example, as noted above, (attempted) misuse of the system may be logged (i.e., as events), providing information as to who performed what type of action at what time. Thus, misuse or the lack thereof may be determined based on the suspicious events.

In accordance with the present invention, it is also possible to execute only parts of the process. For instance, if the queries 15 do not change, only the latest log entries are sent to the service provider where the queries are run against them and results for these entries are returned. If a new query 15 should be executed, only the new encrypted query 16 is sent to the service provider, where it is run against parts of or the entire stored encrypted log (previously provided encrypted log).

The method of the present invention can either be executed on demand or periodically. For example, all logs generated during a day are automatically sent to the service provider at the end of the day. On the other hand, it could be sufficient if the customer only sends the logs to the provider in case information is desired.

The following components are further preferred features of the present invention. For instance, secure channels for transmitting data between the first and second entity and vice versa provide further confidentiality, integrity, and authenticity. Since standard mechanisms for the preferred secure channels can be used, these standard mechanisms are not discussed in further detail.

Moreover, simple verification schemes can be used: After decrypting the results, it can be verified directly whether the returned rows are a match for a specific query. For example, if a query asks for connections between specific IP addresses, then it can easily be checked whether the fields in the returned rows contain these IP addresses (e.g., in a sender IP address and a receiver IP address field).

Thus, the following example focuses on the encryption and query execution. It is preferred to use an encryption scheme that lends itself to an efficient implementation of queries that operate on data encrypted with the encryption scheme. In particular, queries can be executed more efficiently than possible with a purely probabilistic scheme. Moreover, it is further noted that known purely deterministic encryption schemes might provide the risk of frequency analysis.

Log data is preferably provided as time series data. Queries for time series data typically have a temporal component. For example queries over certain time windows or with a certain periodicity. This special kind of data and queries with temporal components lend themselves to using an efficient but still secure encryption scheme. For instance, to mitigate the risk of frequency analysis of the encryption scheme, the present invention preferably uses a k-deterministic encryption scheme.

A k-deterministic encryption scheme is an encryption scheme that, given an encryption key, encrypts any given plaintext with up to k deterministically computable cipher texts for an integer parameter k. In other words, the encryption scheme of the present invention encrypts any given input to one of at most k possible cipher texts uniformly at random. More formally, a general encryption scheme S can be described as a tuple S(KG,E,D), where KG is the key generation function, E encrypts plaintexts, and D decrypts ciphertexts with the appropriate keys. The k-deterministic encryption scheme, as used by the present invention, has the following preferred property. If $C(v, s)$ is the set of all ciphertexts that are generated when encrypting v using key s, then it holds that $|C(v,s)|$ is at most k. The probability that encrypting plaintext v yields ciphertext c is $1/|C(v,s)|$ for each c in $C(v,s)$. This kind of encryption has the desired property of protecting even low-entropy data while enabling data compression by upper bounding the number of (probabilistically computed) ciphertexts for each plaintext to k.

Additional properties are preferably given for encrypted log analysis, in particular additive homomorphism.

Figure 3:
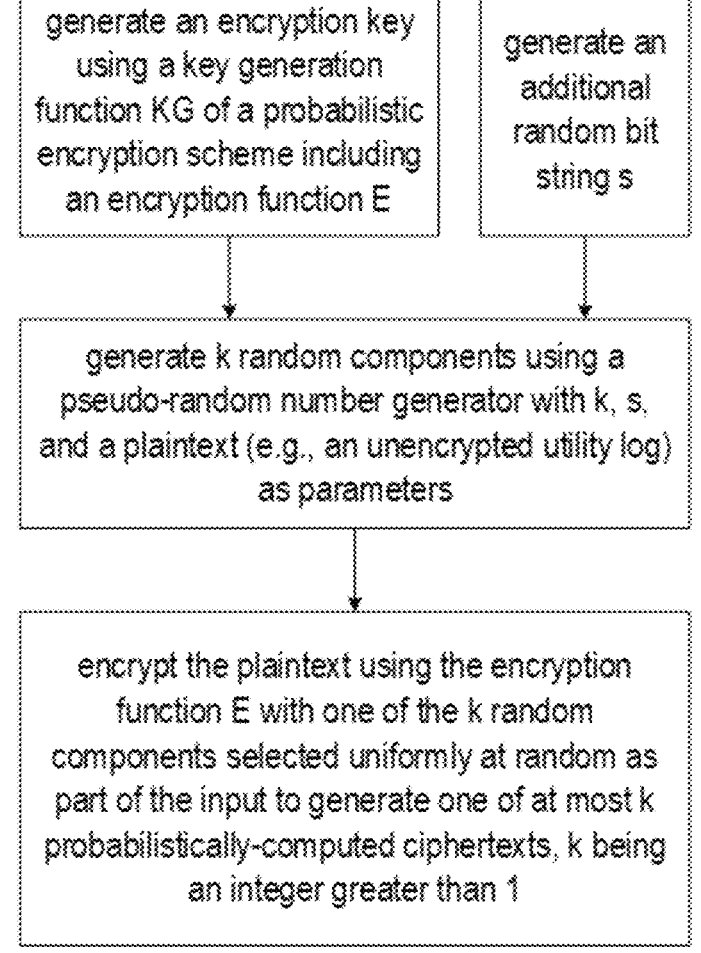
FIG. 3 shows a flowchart of a k-deterministic encryption scheme.

Given a pseudo-random number generator G and a probabilistic encryption scheme S (KG,E,D), the encryption scheme is transformed into a k-deterministic encryption scheme as follows. As shown in the flowchart of FIG. 3, the key generation function remains the same, except for the fact that a random bit string s is generated in addition. A plaintext v is encrypted by using the pseudo-random number generator G with the parameters k, s, and v to generate k random components and then choosing one of them uniformly at random as part of the input for the encryption function E. The decryption function D remains unchanged. If an additively homomorphic probabilistic encryption scheme is turned into a k-deterministic encryption scheme, it is additively homomorphic as well.

According to a preferred embodiment, rather than encrypting the entire log into a single cipher text, the log data can be split into specific fields or groups of fields which are subsequently encrypted with a k-deterministic encryption scheme. Each field of the log file is encrypted separately, preferably using a k-deterministic encryption scheme. Preferably, time and date are split up into multiple columns, i.e., there is a dedicated column for year, month, day, hour, minute, and, if needed, for smaller time units (seconds, milliseconds . . . ) before encryption.

In addition, if there are large time gaps between two consecutive logged events, dummy rows may be inserted. These rows serve two purposes. First, they obfuscate the log by extending with seemingly meaningless data. Second, they help to execute queries over log data efficiently. The time and date of a dummy row are set to values between the two events, with dummy values in the other columns. Preferably, dummy values used in different columns differ to avoid that they are recognized to be dummy values due to their frequent occurrence across columns. The number of added dummy rows between proper rows depends on the queries. For instance, if there are queries asking for intervals in the order of minutes, it is preferred to provide a row for every minute. An additional encrypted column may be appended, providing additional information about the row. A flag column preferably identifies dummy rows as such but it can also provide other information, e.g., a time stamp which indicates that the event occurred at night, which, depending on the event, may be suspicious. Moreover, the columns are preferably permutated to make it harder to identify the meaning of the columns. For example, the first columns often encode the time of the event in time-series data. This is (most likely) no longer true after permutating the columns randomly.

Next, the queries are preferably transformed/encrypted so that they can be executed on encrypted logs. The following examples focus on two types of queries (but other types are possible, as well).

A query can filter for rows where a specific value v is found in a certain column. This query is transformed by changing the column index to the new index in the permutated, encrypted log and by changing the test for equality with v to an equality test for any of the up to k possible cipher texts corresponding to value v.

The second type of query asks for events that occurred in a short window of time, e.g., x times in y minutes. The transformed query simply searches for x consecutive rows where the minute fields have changed no more than y−1 times (indicating that the x events occurred within y minutes).

These two types of queries can be combined to build up more complex queries. As a further, a query could ask for more than one failed connection attempt to a device at a specific IP address with 5 minutes.

While the invention has been described in detail in the drawings and foregoing description, such description is to be considered illustrative or exemplary and not restrictive. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method for establishing cryptographic electronic transmission of an electronic utility log between a utility computer terminal of a utility and a service provider host computer terminal of a service provider host over a network channel to determine misuse of the utility based on suspicious events in the electronic utility log, the method comprising:

receiving, by the service provider host computer terminal, an encrypted electronic utility log from the utility computer terminal, the encrypted electronic utility log encrypted from an unencrypted electronic utility log with a k-deterministic encryption scheme comprising:

generating an encryption key using a key generation function KG of a probabilistic encryption scheme including an encryption function E;

generating an additional random bit string s;

generating k random components using a pseudo-random number generator with k, s, and the unencrypted electronic utility log as parameters; and encrypting the entire unencrypted electronic utility log using the encryption function E with one of the k random components, selected uniformly at random as part of the input, to output a single ciphertext from one of at most k probabilistically-computed cipher-
texts, k being an integer greater than 1;

receiving, by the service provider host computer terminal, an encrypted query from the utility computer terminal, the encrypted query encrypted with the k-deterministic encryption scheme;

analyzing, by the service provider host computer terminal, the encrypted electronic utility log by using the encrypted query;

generating, by the service provider host computer termi- nal, an encrypted electronic analysis result without decrypting the encrypted electronic utility log or the encrypted query; and transmitting the encrypted electronic analysis result from the service provider host computer terminal to the utility computer terminal for decryption and verifica- tion;

decrypting the encrypted electronic analysis result to generate a decrypted analysis result at the utility com- puter terminal;

detecting the suspicious events based on the decrypted analysis result at the utility; and determining that the misuse occurred based on the sus- picious events at the utility.

2. The method of claim 1, wherein the utility is a cluster of utilities.

3. The method of claim 1, wherein the encrypted elec- tronic utility log and the encrypted query are encrypted by a first private/secret key that is not known by the service provider host.

4. The method of claim 1, wherein the electronic utility log is an electronic security log of the utility.

5. The method of claim 1, wherein the electronic utility log is an electronic log of industrial equipment, an electronic security log of a network or an electronic log of an industrial controller.

6. The method of claim 1, wherein the electronic utility log is an electronic log of an entire system that comprises multiple devices.

7. The method of claim 1, wherein the steps of receiving the encrypted electronic utility log, analyzing the encrypted electronic utility log and transmitting the encrypted elec- tronic analysis result are executed periodically.

8. The method of claim 1, wherein the encrypted elec- tronic utility log and the encrypted query are received from the utility computer terminal via a secure network channel.

9. The method of claim 1, wherein the encrypted query is a filter query for locating and identifying a specific value in the electronic utility log, or an occurrence query for evalu- ating whether a particular value is present in the electronic utility log.

10. A method for establishing cryptographic electronic transmission of an electronic utility log between a utility computer terminal of a utility and a service provider host computer terminal of a service provider host over a network channel to determine misuse of the utility based on suspi- cious events in the electronic utility log, the method com- prising:

generating, by the utility computer terminal, an encrypted electronic utility log from an unencrypted electronic utility log by encrypting the unencrypted electronic utility log using a k-deterministic encryption scheme comprising:

generating an encryption key using a key generation function KG of a probabilistic encryption scheme including an encryption function E;

generating an additional random bit string s;

generating k random components using a pseudo-ran- dom number generator with k, s, and the unencrypted electronic utility log as parameters;

encrypting the entire unencrypted electronic utility log using the encryption function E with one of the k random components, selected uniformly at random as part of the input, to output a single ciphertext from one of at most k probabilistically-computed cipher- texts, k being an integer greater than 1;

generating an encrypted query by encrypting a query using the k-deterministic encryption scheme at the utility computer terminal;

transmitting the encrypted electronic utility log and the encrypted query from the utility computer terminal to the service provider host computer terminal so that the encrypted electronic utility log can be analyzed on the service provider host computer terminal using the encrypted query;

receiving, at the utility computer terminal, an encrypted electronic analysis result from the service provider host computer terminal, the encrypted electronic analysis result being an encrypted version of an electronic analysis result based on the electronic utility log and the encrypted query, without the service provider host decrypting the encrypted electronic utility log or the encrypted query;

decrypting, by the utility computer terminal, the encrypted electronic analysis result to generated a decrypted analysis result;

verifying, by the utility, the decrypted analysis result; and detecting, by the utility, the suspicious events based on the encrypted electronic analysis result; and determining, by the utility, that the misuse occurred based on the suspicious events.

11. The method of claim 10, wherein the utility is a cluster of utilities.

12. The method of claim 10, wherein the electronic utility log is an electronic security log of the utility.

13. The method of claim 10, wherein the steps of gener- ating the encrypted electronic utility log, transmitting the encrypted electronic utility log and receiving the encrypted electronic analysis result are executed periodically.

14. The method of claim 10, wherein the electronic utility log is organized in columns and rows and the encrypted electronic utility log is generated by encrypting one or more of:

only parts of the columns separately, or only parts of the rows separately.

15. The method claim 14, wherein the electronic utility log comprises additional dummy rows, dummy columns or dummy entries.

16. The method claim 14, wherein the electronic utility log comprises one or more of:

permutated rows, permutated columns, or additional flags for providing additional information.

17. A method for establishing cryptographic electronic transmission of an electronic utility log between a utility computer terminal of a utility and a service provider host computer terminal of a service provider host over a network channel to determine misuse of the utility based on suspi- cious events in the electronic utility log, the method com- prising:

generating, by the utility computer terminal, an encrypted electronic utility log from an unencrypted electronic utility log by encrypting the electronic utility log using a k-deterministic encryption scheme comprising:

generating an encryption key using a key generation function KG of a probabilistic encryption scheme including an encryption function E;

generating an additional random bit string s;

generating k random components using a pseudo-random number generator with k, s, and the unencrypted electronic utility log as parameters;

encrypting the entire unencrypted electronic utility log using the encryption function E with one of the k random components, selected uniformly at random as part of the input, to output a single ciphertext from one of at most k probabilistically-computed ciphertexts, k being an integer greater than 1;

generating, by the utility computer terminal, an encrypted query by encrypting a query using the k-deterministic encryption scheme;

transmitting, by the utility computer terminal, the encrypted electronic utility log and the encrypted query from the utility computer terminal to the service provider host computer terminal;

analyzing, by the service provider host computer terminal, the encrypted electronic utility log using the encrypted query;

generating, by the service provider host computer terminal, an encrypted electronic analysis result without decrypting the encrypted electronic utility log or the encrypted query;

transmitting, by the service provider host computer terminal, the encrypted electronic analysis result to the utility computer terminal;

decrypting, by the utility computer terminal, the encrypted electronic analysis result to generate a decrypted analysis result;

verifying, by the utility, the decrypted analysis result;

detecting, by the utility, the suspicious events based on the encrypted electronic analysis result; and determining, by the utility, that the misuse occurred based on the suspicious events.

18. The method of claim 17, wherein the utility is a cluster of utilities.

19. The method of claim 17, wherein the steps of generating the encrypted electronic utility log, analyzing the encrypted electronic utility log and transmitting the encrypted electronic analysis result are executed periodically.

20. A system configured to establish cryptographic electronic transmission of an electronic utility log between a utility computer terminal of a utility and a service provider host computer terminal of a service provider host over a network channel to determine misuse of the utility based on suspicious events in the electronic utility log, the system comprising:

the utility computer terminal having a first non-transitory computer readable medium, the utility computer terminal being configured to:

generate an encrypted electronic utility log from an unencrypted electronic utility log by encrypting the unencrypted electronic utility log using a k-deterministic encryption scheme comprising:

generating an encryption key using a key generation function KG of a probabilistic encryption scheme including an encryption function E;

generating an additional random bit string s;

generating k random components using a pseudo-random number generator with k, s, and the unencrypted electronic utility log as parameters;

encrypting the entire unencrypted electronic utility log using the encryption function E with one of the k random components, selected uniformly at random as part of the input, to output a single ciphertext from one of at most k probabilistically-computed ciphertexts, wherein k is an integer greater than 1;

generate an encrypted query by encrypting a query using the k-deterministic encryption scheme; and transmit, via a secure network channel, the encrypted electronic utility log and encrypted query to the service provider host computer terminal; and the service provider host computer terminal having a second non-transitory computer readable medium, the service provider host computer terminal being configured to:

receive, via the secure network channel, the encrypted electronic utility log and the encrypted query from the utility;

analyze the encrypted electronic utility log by using the encrypted query;

generate an encrypted electronic analysis result without decrypting the encrypted electronic utility log or the encrypted query; and transmit, via the secure network channel, the encrypted electronic analysis result to the utility;

wherein the utility computer terminal is further configured to:

receive, via the secure network channel, the encrypted electronic analysis result from the service provider host computer terminal;

decrypt the encrypted electronic analysis result to generate a decrypted analysis result;

verify the decrypted analysis result;

detect the suspicious events based on the decrypted analysis result; and determine that the misuse occurred based on the suspicious events.

21. The system of claim 20, wherein the utility is a cluster of utilities.

\*    \*    \*    \*    \*